United States Patent [19]
Tan

[11] Patent Number: 5,970,595
[45] Date of Patent: *Oct. 26, 1999

[54] POROUS INKING MEMBERS FOR IMPACT PRINTERS AND METHODS OF MAKING THE SAME

[75] Inventor: Yaoping Tan, Miamisburg, Ohio

[73] Assignee: NCR Corporation, Dayton, Ohio

[*] Notice: Under 35 U.S.C. 154(b), the term of this patent shall be extended for 284 days.

[21] Appl. No.: 08/504,100

[22] Filed: Jul. 19, 1995

[51] Int. Cl.⁶ .................................................... B21D 39/03
[52] U.S. Cl. ............................ 29/428; 29/527.2; 101/331; 264/49; 264/331.13; 400/202.4
[58] Field of Search .................................. 29/428, 527.1, 29/527.2; 101/333, 329, 330, 331, 401.1; 264/49, 331.13; 400/202.4

[56] References Cited

U.S. PATENT DOCUMENTS

| | | |
|---|---|---|
| 2,427,836 | 9/1947 | Chollar et al. ............................ 264/49 |
| 2,777,824 | 1/1957 | Leeds . |
| 2,946,094 | 7/1960 | Kawasaki .................................. 264/49 |
| 3,055,297 | 9/1962 | Leeds . |
| 3,171,820 | 3/1965 | Volz . |
| 3,253,542 | 5/1966 | McDonough . |
| 3,342,911 | 9/1967 | Funahashi ................................. 264/49 |
| 3,536,796 | 10/1970 | Rock . |
| 3,640,829 | 2/1972 | Elton . |
| 3,718,532 | 2/1973 | Hayes, Jr. . |
| 3,898,360 | 8/1975 | Neumann et al. . |
| 3,928,521 | 12/1975 | Haren et al. . |
| 3,932,251 | 1/1976 | Tanaka ...................................... 264/49 |
| 3,971,315 | 7/1976 | Hansen . |
| 4,157,424 | 6/1979 | Boutle . |
| 4,195,570 | 4/1980 | Haren ....................................... 264/49 |
| 4,226,886 | 10/1980 | Lakes . |
| 4,247,498 | 1/1981 | Castro . |
| 4,410,643 | 10/1983 | Muller . |
| 4,824,621 | 4/1989 | Piepmeier, Jr. et al. ................... 264/49 |
| 5,099,759 | 3/1992 | Sonobe et al. . |
| 5,187,232 | 2/1993 | Musch et al. . |

FOREIGN PATENT DOCUMENTS

| | | |
|---|---|---|
| 671622 | 5/1952 | United Kingdom . |
| 671786 | 5/1972 | United Kingdom . |

*Primary Examiner*—Andrea L. Pitts
*Assistant Examiner*—Monica Smith
*Attorney, Agent, or Firm*—Millen, White, Zelano & Branigan

[57] ABSTRACT

Porous inking members for impact printers and methods of making the same which control the ink transfer flow rate from the porous inking members to dot matrix or other impact print heads. One preferred embodiment of the porous inking members for impact printers and methods of making the same uses peptizer and liquid nitrile rubber as ingredients in the manufacturing process to produce porous inking members.

5 Claims, 3 Drawing Sheets

POROUS INKING MEMBERS FOR IMPACT PRINTERS AND METHODS OF MAKING THE SAME

BACKGROUND AND SUMMARY OF THE INVENTION

The present invention relates generally to new and novel improvements in porous inking members for impact printers and methods of making the same. More particularly, the present invention relates to porous inking members for impact printers and methods of making the same which are particularly suitable for retaining ink and providing a controlled uniform rate of ink transfer flow from the porous inking members to dot matrix and other impact print heads resulting in increased numbers of legible printed characters and images and enhanced useful porous inking member life.

Porous inking members have found wide acceptance as an easy to use and relatively inexpensive source of printing ink for dot matrix and other impact printing operations carried out by a variety of printers. Such porous inking members generally produce dark printed characters and images when new, but the darkness of the printed characters and images gradually fades as the ink originally present in the porous ink member is consumed during the printing process.

It is generally desirable to reduce the rate of fading of printed characters and images produced from porous inking members and thereby extend the useful life of the porous inking members. Such porous inking members generally consist of a cylindrical porous rubber or foam member which is impregnated with a liquid ink. The liquid ink is transferred from the porous inking member to the dot matrix or other impact print head through either direct contact between the porous inking member and the dot matrix or other impact print head or, more often, through indirect contact by use of a transfer roll positioned between the porous inking member and the dot matrix or other impact print head.

The process to manufacture such porous inking members generally involves the use of volatile organic solvents, such as toluene. However, the use of such volatile organic solvents can present not only an air pollution hazard, but can also have the potential to impair the health of workers. In order to reduce or eliminate the use of volatile organic solvents, such as toluene, efforts have been made to investigate alternative materials or methods to manufacture porous inking members. Several other manufacturing processes are known for making porous inking members, such as the thermoplastic resin method, the thermoset polyurethane forming method and the thermoplastic polyurethane extrusion method. However, all of these known prior art porous inking member manufacturing processes involve the use of hazardous substances and/or expensive equipment.

Accordingly, an object of the present invention is the provision of porous inking members for impact printers and methods of making the same which do not use volatile organic solvents, such as toluene, in the manufacturing process.

Another object of the present invention is to provide porous inking members for impact printers and methods of making the same which eliminate the organic solvent evaporation cycle in the manufacturing process.

A further object of the present invention is to provide porous inking members for impact printers and methods of making the same which provide more flexibility in the manufacturing process by having increased material storage and shelf life following the step of mixing the ingredients and prior to the step of transfer molding.

Still a further object of the present invention is to provide porous inking members for impact printers and methods of using the same which provide a relatively uniform rate of ink transfer resulting in increased numbers of legible printed characters and images and thus enhanced useful service life.

Yet another object of the present invention is to provide porous inking members for impact printers and methods of using the same which are safer to manufacture in terms of workers' health and the environment.

Still yet another object of the present invention is to provide porous inking members for impact printers and methods of using the same which maximize the use of existing manufacturing and production equipment and engineering expertise.

These and other objects of the present invention are attained by the provision of porous inking members for impact printers and methods of making the same which control the ink transfer flow rate from the porous inking members to dot matrix or other impact print heads. One preferred embodiment of the porous inking members for impact printers and methods of making the same uses peptizer and liquid nitrile rubber as ingredients in the manufacturing process to produce porous inking members.

Other objects, advantages and novel features of the present invention will become apparent in the following detailed description of the invention when considered in conjunction with the accompanying drawings.

DETAILED DESCRIPTION OF THE DRAWINGS

Figure 1:
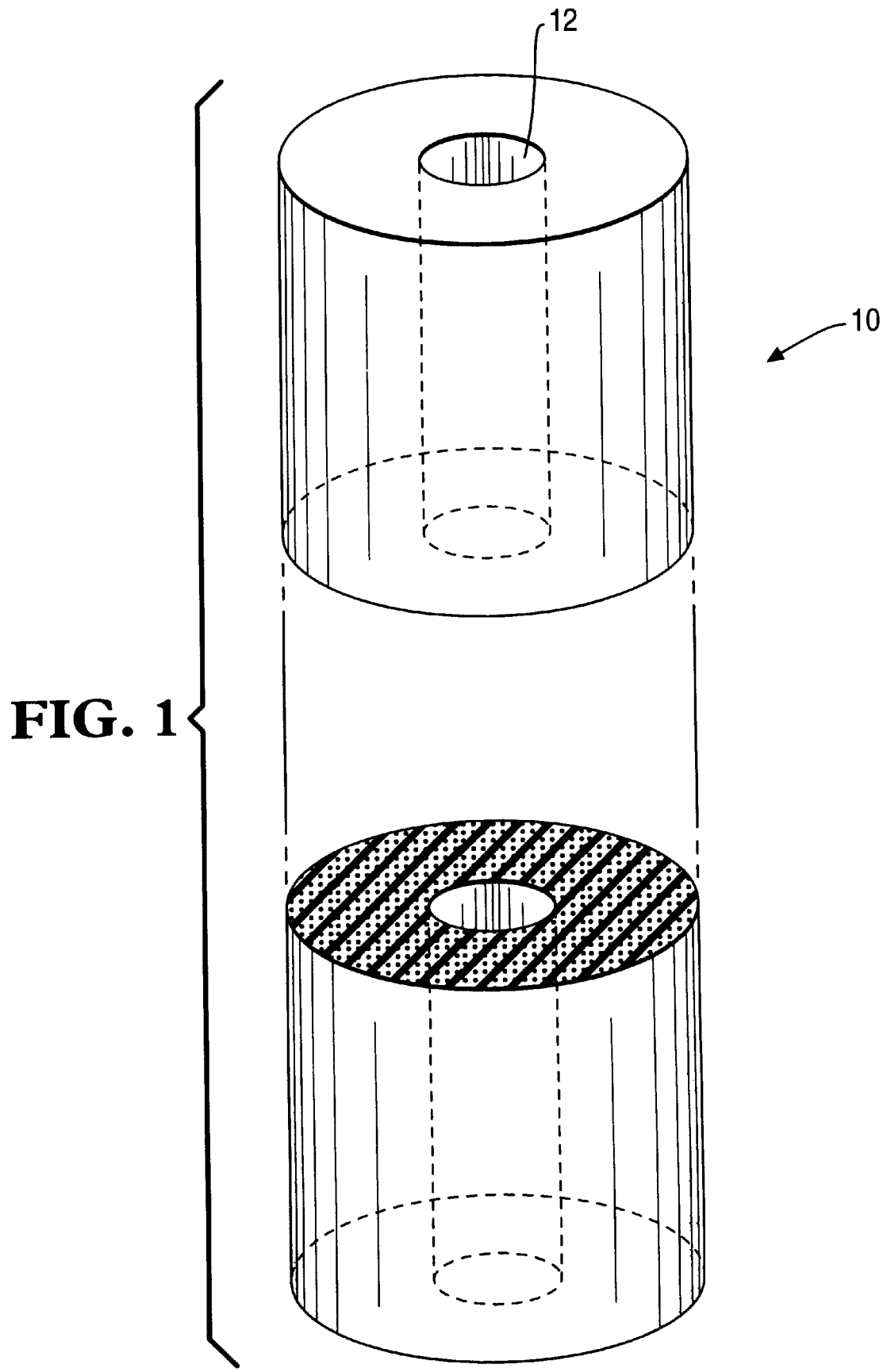
FIG. 1 shows a perspective view of a representative configuration of a porous inking member in accordance with the present invention.

Referring now to the drawings, in which like-referenced characters indicate corresponding elements throughout the several views, attention is first drawn to FIG. 1 which illustrates a first preferred embodiment of a representative porous inking member configuration, generally identified by reference numeral 10, in accordance with the present invention. Representative porous inking member configuration 10 is generally cylindrical in configuration and preferably includes cylindrical opening 12 which permits representative porous inking member configuration 10 to rotate about a pin or projection (not shown). The diameter of cylindrical opening 12, the outside diameter of representative porous inking member configuration 10 and the height of representative porous inking member configuration 10 can be designed to be compatible with impact printers of different sizes and configurations.

Figure 2:
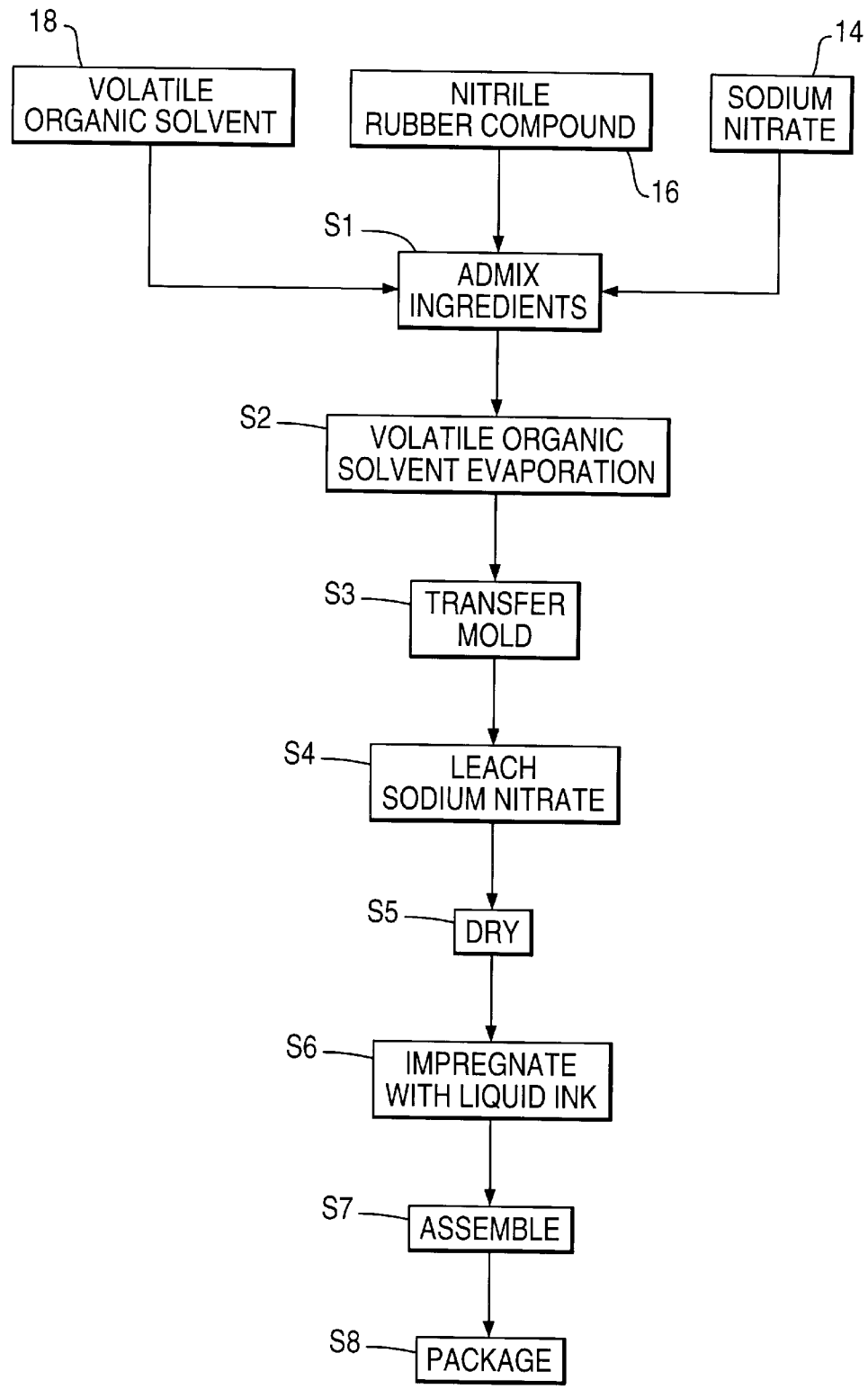
FIG. 2 is a flow chart showing a typical prior art manufacturing process for producing porous inking members for impact printers.

Referring now to FIG. 2, a flow chart showing a typical prior art manufacturing process for producing porous inking members for impact printers is shown. Such prior art manufacturing processes typically involve admixing particles of sodium nitrate 14 into nitrile rubber compound 16 with volatile organic solvent 18 (step S1). Next volatile organic solvent 18 is allowed to evaporate over, typically, a period of three to eight weeks (step 2). The resultant combination of nitrile rubber compound 16 and sodium nitrate 14 is then molded into a desired configuration using a transfer mold (step S3). Next, sodium nitrate 14 is leached from the molded rolls (step S4). Representative porous inking member configuration 10 is allowed to dry (step S5) and is then impregnated with liquid ink (step S6). The next step is to assemble representative porous inking member configuration 10 into an assembly which permits installation of representative porous inking member configuration 10 into an impact printer (step S7) and package representative porous inking member configuration 10 assembly for shipment and storage (step S8).

One important step in the above-described prior art manufacturing process for producing representative porous inking member configuration 10 is the step of admixing particles of sodium nitrate 14 into nitrile rubber compound 16 with volatile organic solvent 18 (step S1). In this step, a significant amount of volatile organic solvent 18, typically toluene, is used to assist in masticating and swelling the rubber so a large quantity of sodium nitrate 14 can be incorporated into nitrile rubber compound 16. This step has been difficult to accomplish without the use of volatile organic solvent 18. Furthermore, if an insufficient amount of volatile organic solvent 18 is used, the molecular weight of nitrile rubber compound 16 will not be sufficiently broken down during the admixing step. This can result in the rubber molecules in nitrile rubber compound 16 becoming more highly oriented or stretched during the transfer molding step. This can result in increased levels of stress which will often remain or be "frozen" into nitrile rubber compound 16 as nitrile rubber compound 16 begins to vulcanize. Such increased levels of stress cannot be released because of the high content of sodium nitrate 14 in the vulcanite. As the molded rolls are leached and dried in an oven, the molded rolls can shrink excessively as a result of the release of these internal stresses. Such abnormal shrinkage significantly reduces the life of representative porous inking member configuration 10 due to the collapse of interconnected voids present in the molded roll.

In addition, in the typical prior art manufacturing process for producing porous inking members for impact printers shown in FIG. 2, the transfer molding operation (Step S3) is generally performed between three and eight weeks after the admixing operation (Step S1). This period of time is important because prior to three weeks following the admixing operation (Step S1), a high level of volatile organic solvent 18 can remain in nitrile rubber compound 16 which can present an explosion risk during the transfer molding operation (Step S3). On the other hand, after eight weeks, the transfer molding process becomes more difficult because of pre-curing or aging of nitrile rubber compound 16 during storage.

Figure 3:
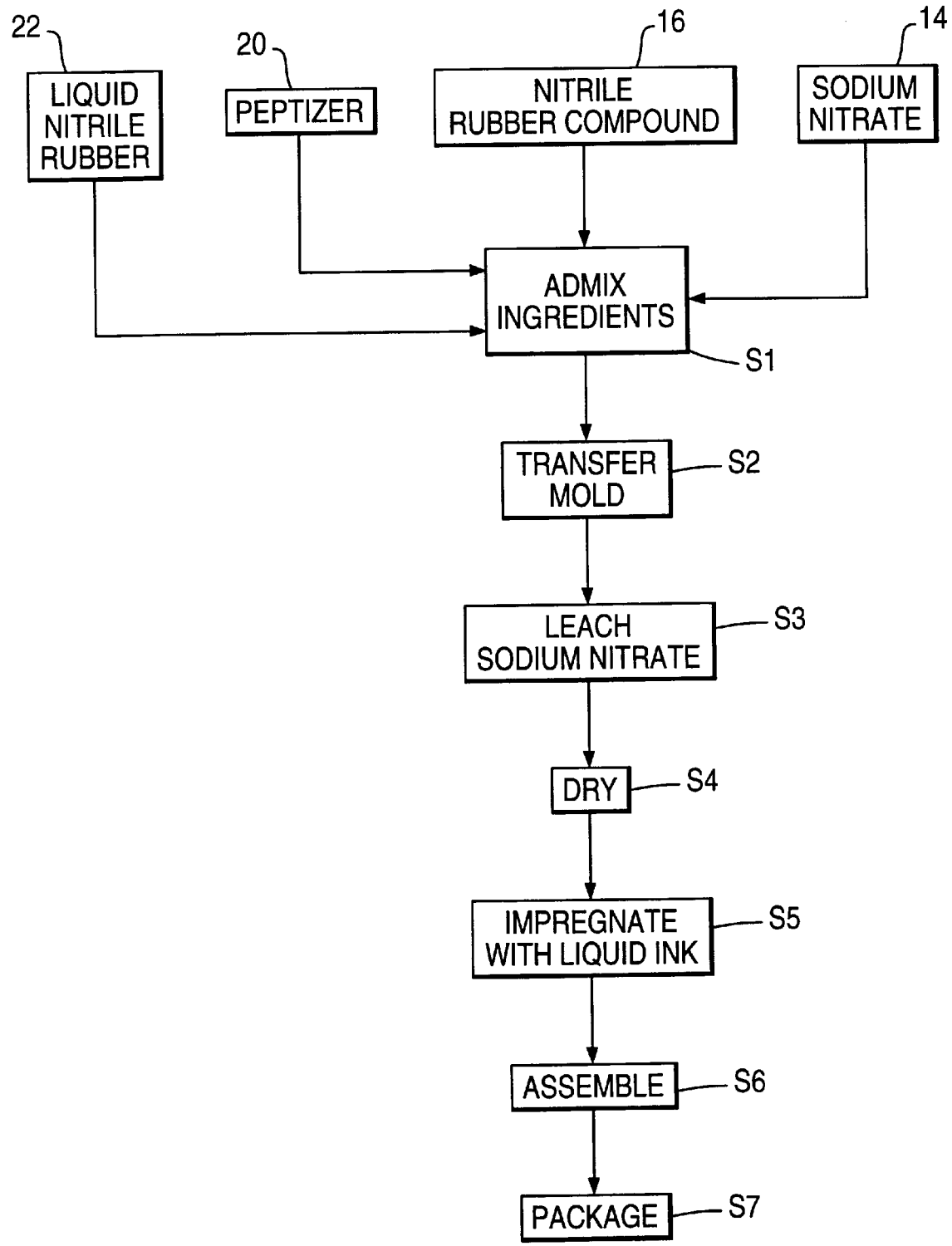
FIG. 3 is a flow chart showing a preferred embodiment of the manufacturing process for producing porous inking members for impact printers in accordance with the present invention.

Referring now to FIG. 3, two new ingredients, peptizer 20 and liquid nitrile rubber 22, are used in admixing operation (step S1) which is accomplished without the use of any volatile organic solvent. This permits the elimination of the volatile organic solvent evaporation period (step S2 of FIG. 2). The resultant combination of nitrile rubber compound 16, sodium nitrate 14, peptizer 20 and liquid nitrile rubber 22 can be molded into a desired configuration using a transfer mold (step S2) immediately following the admixing operation (step S1), or as late as five months following the admixing operation (step S1). This provides greater flexibility for the manufacturer in scheduling when the transfer molding operation (step S2) is to be accomplished using the manufacturing process in accordance with the present invention.

The remaining manufacturing steps are similar to those described in connection with FIG. 2, the flow chart showing a typical prior art manufacturing process for producing porous inking members for impact printers. Next, sodium nitrate 14 is leached from the molded roll (step S3), preferably by placing the molded roll into water at a temperature of 70 to 80° C. for a period of two to three days. Representative porous inking member configuration 10 is then allowed to dry (step S4), preferably at an elevated temperature of 120 to 140° F. for approximately twelve hours. Representative porous inking member configuration 10 is then impregnated with liquid ink (step S5), preferably by soaking representative porous inking member configuration 10 in an ink bath of liquid caster oil-based ink heated to an elevated temperature of 120 to 140° F. for a period of approximately 48 hours. The next step is to assemble representative porous inking member configuration 10 into a configuration which permits installation of representative porous inking member configuration 10 into an impact printer (step S6) and packaging representative porous inking member configuration assembly for shipment and storage (step S7).

An exemplary formulation used in connection with the manufacturing process for producing representative porous inking member configuration 10 in accordance with the present invention is shown in the table below:

| Materials | Parts Per Hundred Rubber | Experimental Range |
| --- | --- | --- |
| Nitrile Rubber Compound | 100 | 100 |
| Peptizer | 13.5 | 5–40 |
| Liquid Nitrile Rubber | 21.8 | 5–50 |
| Sodium Nitrate | 737 | 200–1000 |

One of the two new ingredients is peptizer 20 which aids in the breakdown of nitrile rubber compound 16 by reacting with the free chain ends produced from chain scission during the admixing operation (step S1), thus precluding these free chain ends from recombining. As a result, the molecular weight of nitrile rubber compound 16 is substantially decreased. Therefore, a low level of internal stress is generated in nitrile rubber compound 16 during the subsequent transfer molding operation (step S2).

Several types of peptizers have been examined, including a mineral oil-sulfonic acid type marketed as "Bondogen E" by Struktol Company of America in Stow, Ohio, a mineral oil-sulfonate ester type marketed as "Peptizer 566" by The C. P. Hall Company in Chicago, Ill. and a powdered pentachorothiophenol type marketed as "Renacit 7" by Mobay Corporation in Pittsburgh, Pa. All of these peptizers types were found to break-down nitrile rubber compound 16 effectively. Other ingredients, such as a zinc salt of fatty acids marketed as "Akrochem Proaid" by Akrochem Company in Akron, Ohio, a complex organic compound marketed as "Pastone" by Harwick Chemical Corporation in Akron, Ohio and a polybutadiene resin marketed as "Ricon P30D" by Colorado Chemical Specialties, Inc. in Broomfield, Colo. can be used to aid in the breakdown of nitrile rubber compound 16.

However, when using peptizer 20 alone, the resultant nitrile rubber compound 16 is loose and dry, lacking integrity or cohesion strength so the admixing operation (step S1) is still difficult to accomplish. Thus, a second ingredient in the above formulation is liquid nitrile rubber 22 which tackifies nitrile rubber compound 16 and bonds nitrile rubber compound 16 and sodium nitrate 14 together. When liquid nitrile rubber 22 is used in blends with other nitrile rubbers, it also acts as a plasticizer or softener, improving the flow and knitting characteristics of nitrile rubber compound 16 during mixing and becoming a part of the rubber matrix after vulcanization. Thus, the addition of liquid nitrile rubber 22 makes the admixing operation (step S1) more feasible and also allows the development of nitrile rubber compound 16 which is essentially free of extractable or volatile components. Liquid nitrile rubber 22 is preferably a low molecular liquid nitrile rubber, such as the low molecular liquid nitrile rubber marketed as "Nipol 1312" by Zeon Chemicals, Inc. in rolling Meadows, Ill. Other liquid rubbers, sulfur-reacted vegetable oils, phenol-formaldehyde thermoplastic resins, paraffinic, aromatic and ester plasticizers, coumarone-indene resins, pine tar compounds and Plasthall-silicate blends could be used as a substitute for liquid nitrile rubber 22 and as a plasticizer or tackifier in nitrile rubber compound 16.

With the proper amounts and combination of peptizer 20 and liquid nitrile rubber 22, the admixing operation (step S1) can be performed successfully and the transfer molded porous ink rolls do not shrink abnormally during the drying operation (step S4). In addition, since peptizer 20 and liquid nitrile rubber 22 are nonvolatile, the admixed rubber compound can be safely molded immediately after mixing. Furthermore, the admixed rubber compound can still be molded as much as five months later because peptizer 20 acts as an effective scorch retarder which delays the pre-curing or aging process of nitrile rubber compound 16 during storage. This provides the manufacturer with greater flexibility in scheduling the transfer molding operation (step S2). Except for lower hardness, representative porous inking member configuration 10 made in accordance with the manufacturing process of the present invention have similar physical properties, including shrinkage, ink weight absorbed, printing characteristics and product life to porous inking members made using the prior art manufacturing process shown and described in connection with FIG. 2.

In summary, the manufacturing process for producing porous inking members for impact printers in accordance with the present invention eliminates the use of hazardous volatile organic solvents. This eliminates the volatile organic solvent evaporation period (step S2 of FIG. 2) inherent in prior art manufacturing processes and reduces the "waiting" period from the admixing operation (step S1 in FIG. 2 and 3) from at least three weeks (step S2 in FIG. 2) down to zero (step S2 in FIG. 3). It also significantly prolongs the shelf-life of the unvulcanized nitrile rubber compound. In addition, peptizer 20 and liquid nitrile rubber 22 are much safer in terms of workers' health and the environment as compared to the use of toluene and other volatile organic solvents inherent in prior art porous inking member manufacturing processes.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A porous inking member for impact printers produced using a process for making porous inking members for impact printers comprising the steps of:

admixing 200 to 1000 parts per hundred sodium nitrate, 100 parts per hundred nitrile rubber compound, 5 to 40 parts per hundred peptizer and 5 to 50 parts per hundred liquid nitrile rubber together to form a resultant admixed nitrile rubber compound;

molding said admixed nitrile rubber compound into a molded porous inking member configuration;

leaching said sodium nitrate from said molded porous inking member configuration;

drying said molded porous inking member configuration; and impregnating said molded porous inking member configuration with a liquid-ink.

2. A porous inking member as in claim 1 incorporated within a molded porous inking member configuration assembly for impact printers which is produced using a process comprising the steps of:

admixing 200 to 1000 parts per hundred sodium nitrate, 100 parts per hundred nitrile rubber compound, 5 to 40 parts per hundred peptizer and 5 to 50 parts per hundred liquid nitrile rubber together to form a resultant admixed nitrile rubber compound;

molding said admixed nitrile rubber compound into a molded porous inking member configuration;

leaching said sodium nitrate from said molded porous inking member configuration;

drying said molded porous inking member configuration by exposing said molded porous inking member configuration to an elevated temperature of 120 to 140° F. for a period of approximately 12 hours; and impregnating said molded porous inking member configuration with a liquid ink by submerging said molded porous inking member configuration in a liquid ink bath at an elevated temperature of 120 to 140° F. for a period of approximately 48 hours; and assembling said molded porous inking member configuration into a molded porous inking member configuration assembly which permits installation of said molded porous inking member configuration assembly into an impact printer.

3. A porous inking member as in claim 2, wherein said ink is a liquid caster-oil based ink.

4. A porous inking member as in claim 1, wherein said ink is a liquid caster-oil based ink.

5. A porous inking member as in claim 1, which is incorporated into a molded porous inking member configuration assembly which permits installation of said porous inking member into an impact printer.

\* \* \* \* \*

UNITED STATES PATENT AND TRADEMARK OFFICE
CERTIFICATE OF CORRECTION

PATENT NO. : 5,970,595
DATED : October 26, 1999
INVENTOR(S) : Yaoping Tan

It is certified that error appears in the above-identified patent and that said Letters Patent is hereby corrected as shown below:

Column 6,
Line 28, after "compound;" add -- wherein the peptizer is selected from the group consisting of mineral oil-sulfonic acid peptizers, mineral oil-sulfonate ester peptizers and pentachlorothiophenol peptizers; --.

Signed and Sealed this

Twentieth Day of November, 2001

Attest:

NICHOLAS P. GODICI
Attesting Officer    Acting Director of the United States Patent and Trademark Office